(12) United States Patent
Daio et al.

(10) Patent No.: US 12,724,128 B2
(45) Date of Patent: Sep. 1, 2026

(54) LIGHT SOURCE DRIVING DEVICE, LIGHT SOURCE DEVICE, AND IMAGE CAPTURING DEVICE

(71) Applicant: SONY SEMICONDUCTOR SOLUTIONS CORPORATION, Kanagawa (JP)

(72) Inventors: Katsuhisa Daio, Kagoshima (JP); Hayato Kamizuru, Kagoshima (JP); Kouji Mori, Kumamoto (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1036 days.

(21) Appl. No.: 17/908,645

(22) PCT Filed: Jan. 22, 2021

(86) PCT No.: PCT/JP2021/002166
§ 371 (c)(1),
(2) Date: Sep. 1, 2022

(87) PCT Pub. No.: WO2021/181907
PCT Pub. Date: Sep. 16, 2021

(65) Prior Publication Data

US 2023/0102951 A1 Mar. 30, 2023

(30) Foreign Application Priority Data

Mar. 13, 2020 (JP) ................................ 2020-044752

(51) Int. Cl.

| | |
|---|---|
| ***G01S 7/484*** | (2006.01) |
| ***G01S 7/481*** | (2006.01) |
| ***G01S 17/894*** | (2020.01) |

(52) U.S. Cl.
CPC ............ *G01S 7/484* (2013.01); *G01S 7/4815* (2013.01); *G01S 17/894* (2020.01)

(58) Field of Classification Search
CPC ....... G01S 7/484; G01S 7/4815; G01S 17/894
See application file for complete search history.

(56) References Cited

U.S. PATENT DOCUMENTS 7,525,670 B1 4/2009 Burkatovsky
9,244,171 B2 1/2016 Park et al.
(Continued)

FOREIGN PATENT DOCUMENTS

EP 3540468 B1 * 7/2023 ........... G01S 7/4865
JP 2011-516857 5/2011
(Continued)

OTHER PUBLICATIONS

International Search Report and Written Opinion prepared by the Japan Patent Office on Mar. 16, 2021, for International Application No. PCT/JP2021/002166, 4 pgs.

*Primary Examiner* — Assres H Woldemaryam
(74) *Attorney, Agent, or Firm* — SHERIDAN ROSS P.C.

(57) ABSTRACT

The configuration of a light source driving device, which drives a plurality of light sources that emit light to an object to measure the distance to the object, is simplified. A light source device drives a plurality of light sources provided in a system that measures the distance to the object. The light source driving device is provided in the light source device. The light source driving device includes a light source control unit that individually controls emission of light from a plurality of light sources that emit the light to an object to measure a distance to the object.

18 Claims, 13 Drawing Sheets

(56) References Cited

U.S. PATENT DOCUMENTS

2015/0185325 A1 7/2015 Park et al.
2017/0302373 A1* 10/2017 Yamakami ......... H04B 10/5057
2019/0310375 A1* 10/2019 Finkelstein ............. G01S 7/484
2020/0249318 A1* 8/2020 Henderson ............ G01S 7/4814
2020/0284884 A1* 9/2020 Henderson ........... H04N 25/773
2020/0300978 A1* 9/2020 McGuire ............... G01S 7/4865

FOREIGN PATENT DOCUMENTS

JP 2013003472 A 1/2013
JP 2014-063063 4/2014
JP 2014063063 A * 4/2014 ............. G09G 3/025
JP 2017-138110 8/2017
JP 2019045334 A 3/2019
JP 2019-158546 9/2019
JP 2020-027874 2/2020

* cited by examiner

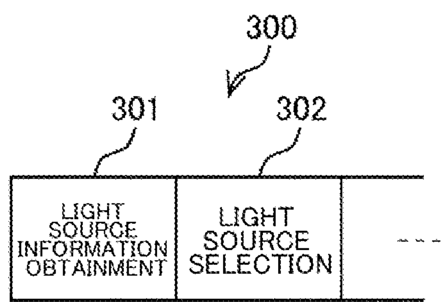

B

| ITEM | VALUE | OPERATION |
| --- | --- | --- |
| LIGHT SOURCE INFORMATION OBTAINMENT | 0 | DO NOT OBTAIN LIGHT SOURCE INFORMATION |
| | 1 | OBTAIN LIGHT SOURCE INFORMATION |
| LIGHT SOURCE SELECTION | 0 | SELECT A CHANNEL AND B CHANNEL (APPLY LIGHT SOURCE INFORMATION OF A CHANNEL TO B CHANNEL) |
| | 1 | SELECT A CHANNEL AND B CHANNEL (APPLY LIGHT SOURCE INFORMATION OF RESPECTIVE CHANNELS) |
| | 2 | SELECT A CHANNEL |
| | 3 | SELECT B CHANNEL |

LIGHT SOURCE DRIVING DEVICE, LIGHT SOURCE DEVICE, AND IMAGE CAPTURING DEVICE

CROSS REFERENCE TO RELATED APPLICATIONS

This application is a national stage application under 35 U.S.C. 371 and claims the benefit of PCT Application No. PCT/JP2021/002166, having an international filing date of 22 Jan. 2021, which designated the United States, which PCT application claimed the benefit of Japanese Patent Application No. 2020-044752, filed 13 Mar. 2020, the entire disclosures of each of which are incorporated herein by reference.

TECHNICAL FIELD

The present disclosure relates to a light source driving device, a light source device, and an image capturing device. The present disclosure particularly relates to a light source driving device that drives a plurality of light sources, as well as a light source device and an image capturing device including the light source driving device.

BACKGROUND ART

In the past, rangefinding devices have been used to measure the distance to an object. For example, a rangefinding device is used to measure the distance to an object by irradiating the object with light and detecting light reflected by the object. The distance to the object can be measured by measuring the time it takes for the light to travel to, and then return from, the object. For example, a rangefinding device including a plurality of light sources is used as such a rangefinding device (see for example, PTL 1).

This rangefinding device includes light-emitting units that emit a plurality of laser beams having different wavelengths, and both measures the distance to an object and obtains color information of the object. A scanning mechanism unit that controls the emission of the laser light is disposed in each of the plurality of light-emitting units. This scanning mechanism unit controls the emission of the laser light over a wide area to cause the laser light to scan.

CITATION LIST

Patent Literature

[PTL 1]
JP 2017-138110 A

SUMMARY

Technical Problem

In the conventional technique described above, there is a problem in that a scanning mechanism unit, which is a control unit, is provided in each of the plurality of light-emitting units, which makes the configuration of the device complex.

Having been achieved in light of the above-mentioned problem, an object of the present disclosure is to simplify the configuration of a light source driving device that drives a plurality of light sources.

Solution to Problem

The present disclosure has been achieved to solve the above-described problem, and a first aspect thereof is a light source driving device including a light source control unit that individually controls emission of light from a plurality of light sources that emit the light to an object to measure a distance to the object.

Additionally, in this first aspect, each of the light sources may include a laser diode.

Additionally, in this first aspect, the light source control unit may control the emission of the light based on a light emission condition that is a condition for emitting the light in the plurality of light sources.

Additionally, in this first aspect, the light source control unit may control the emission of the light based on the light emission condition, the light emission condition including a light amount in the plurality of light sources.

Additionally, in this first aspect, the light source control unit may control the emission of the light based on the light emission condition, the light emission condition including an emission range of the light in the plurality of light sources.

Additionally, in this first aspect, the light source driving device may further include a light source information obtainment unit that obtains light source information that is information about the plurality of light sources, and the light source control unit may control the emission of the light based on the light source information and the light emission condition.

Additionally, in this first aspect, the light source information obtainment unit may obtain ambient light in the plurality of light sources as the light source information.

Additionally, in this first aspect, the light source information obtainment unit may obtain information about light emission current, the light emission current being current that causes the plurality of light sources to emit light, as the light source information.

Additionally, in this first aspect, the light source information obtainment unit may obtain information about a threshold of the light emission current in the plurality of light sources as the light source information.

Additionally, in this first aspect, the light source information obtainment unit may obtain information about a linearity of the light emission current in the plurality of light sources as the light source information.

Additionally, in this first aspect, the light source information obtainment unit may obtain damage to the plurality of light sources as the light source information.

Additionally, in this first aspect, the light source driving device may further include a light source information holding unit that holds the light source information obtained.

Additionally, in this first aspect, the light source information obtainment unit may obtain the light source information based on a detection result from a light-receiving unit that detects light.

Additionally, in this first aspect, the light source control unit may control the emission of the light based on the light emission condition, the light emission condition including information as to whether or not to obtain the light source information.

Additionally, in this first aspect, the light source control unit may control the plurality of light sources to emit the light simultaneously.

Additionally, a second aspect of the present disclosure is a light source device including: a plurality of light sources that emit light to an object to measure a distance to the object; and a light source control unit that individually controls emission of the light in the plurality of light sources.

Additionally, a third aspect of the present disclosure is an image capturing device including: a plurality of light sources that emit light to an object; a light source control unit that individually controls emission of the light in the plurality of light sources; a sensor that detects reflected light that has been emitted and reflected by the object; and a processing circuit that performs processing of detecting a distance to the object by measuring a time from when the light is emitted to when the reflected light is detected.

These aspects of the present disclosure provide an effect in that a light source control unit controls a plurality of light sources.

BRIEF DESCRIPTION OF DRAWINGS

FIG. 5 is a diagram illustrating an example of light emission conditions according to an embodiment of the present disclosure.

DESCRIPTION OF EMBODIMENTS

Figure 1:
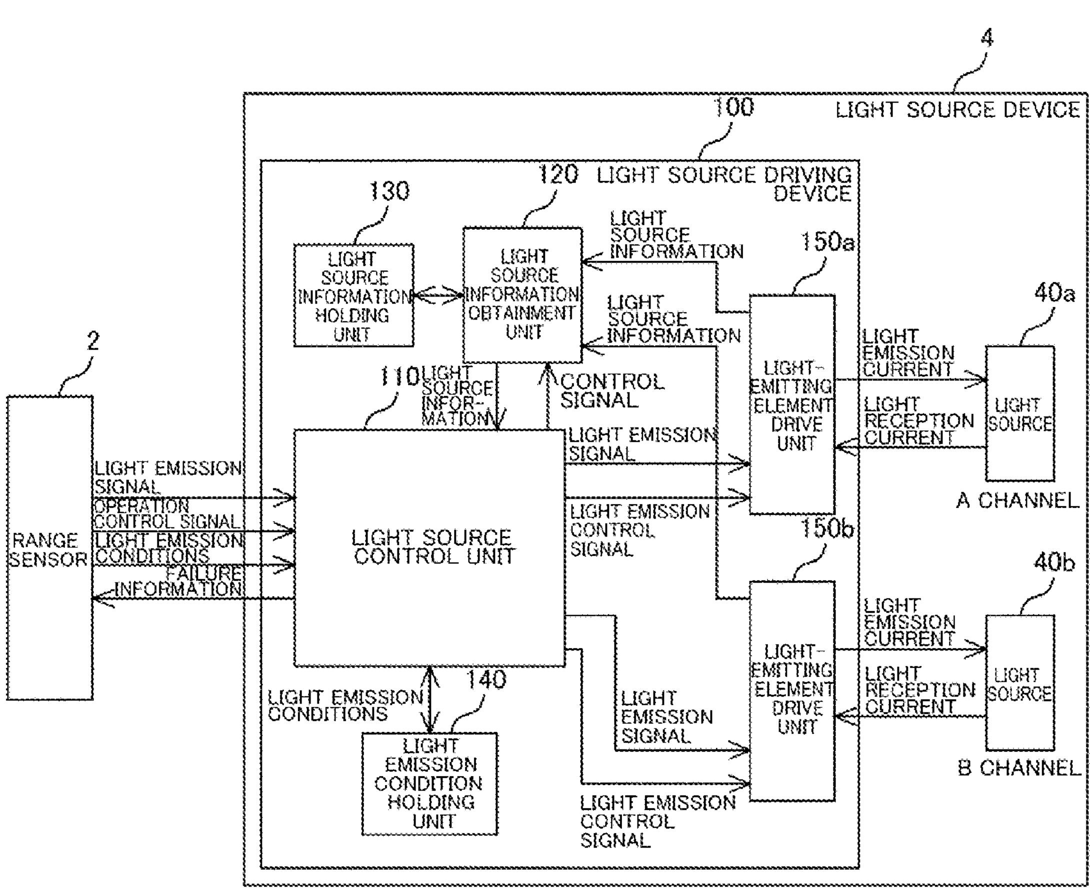
FIG. 1 is a diagram illustrating an example of the configuration of a light source device according to an embodiment of the present disclosure.

Next, modes for carrying out the present disclosure (hereinafter referred to as embodiments) will be described with reference to the drawings. In the following drawings, the same or similar portions are denoted by the same or similar reference numerals and signs. In addition, embodiments will be described in the following order.

1. First Embodiment

2. Variations

3. Example of Application in Rangefinding Device

1. First Embodiment

[Configuration of Image Sensor]

FIG. 1 is a diagram illustrating an example of the configuration of a light source device according to an embodiment of the present disclosure. A light source device 4 in the figure is a device that emits light to an object to measure the distance to the object. A range sensor 2 in the same figure measures the distance to the object by causing the light source device 4 to emit light. The light source device 4 in the figure includes light sources 40*a* and 40*b*, and a light source driving device 100.

The light sources 40*a* and 40*b* emit light to the object. The light emitted to the object is reflected by the object and becomes reflected light, which is detected by the range sensor 2 described above. In this case, the time from the emission of light from the light sources 40 and the like to the detection by the range sensor 2 is measured. In other words, the light travels back and forth, to and from the object, and the time required for the back-and-forth travel is measured. The light sources 40*a* and the like are provided with a light-emitting element such as a laser diode, for example, and emit light based on predetermined conditions. The light sources 40*a* and the like include a light-receiving element that detects light from its own light-emitting element. Two light sources having identical configurations can be used for the light source 40*a* and the light source 40*b*. Light sources having different characteristics, configurations, and the like may be used as the light source 40*a* and the light source 40*b*. The configurations of the light sources 40*a* and the like will be described in detail later.

The light source driving device 100 drives the plurality of light sources 40 (the light sources 40*a* and 40*b*). This light source driving device 100 controls the emission of light in the plurality of light sources 40. The light source driving device 100 in the figure represents an example of controlling two light sources 40. The light source driving device 100 shown in the figure includes a light source control unit 110, a light source information obtainment unit 120, a light source information holding unit 130, a light emission condition holding unit 140, and light-emitting element drive units 150*a* and 150*b*.

The light source control unit 110 controls the emission of light in the plurality of light sources 40. The light source control unit 110 controls the entire light source driving device 100. The light source control unit 110 controls the light sources 40 and the like based on signals and the like input from the range sensor 2. As illustrated in the figure, a light emission signal, an operation control signal, and light emission conditions are input from the range sensor 2.

The light emission signal is a signal that indicates a light emission period of the light sources 40 and the like, and is a signal constituted by a series of rectangular pulses. During range measurement, the light sources 40 and the like emit pulsed light by repeating emission and non-emission. The light emission signal is a signal that defines the periods of emission and non-emission to generate the pulsed light. This light emission signal changes at high speed and can therefore be transmitted by LVDS (Low Voltage Differential Signaling).

The operation control signal is a signal that indicates the period during which light is emitted and the timing at which the light emission conditions, described below, are sent. The rectangular pulsed light emission signal described above is output during the period in which light is emitted.

The light emission conditions are data representing conditions for emitting light in the light source device 4. These light emission conditions can be constituted by a bit string representing a plurality of conditions. The light emission conditions correspond to, for example, an emitted light amount. The range sensor 2 determines the emitted light amount and the like according to the object to be measured and outputs the emitted light amount to the light source device 4 as the light emission conditions.

Conditions for determining whether to obtain light source information before emitting light can also be used as the light emission conditions. Here, the light source information is information of the light sources 40, which corresponds to a light emission current that is a current which causes the light sources 40 to emit light. This light emission current is current that causes the light-emitting elements provided in the light sources 40 to emit light. The light emission current information corresponds, for example, to a threshold at which light emission is started, the linearity of the light emission current with respect to emission, and the like. The light source information also corresponds to an amount of ambient light. This information is information necessary to cause the light sources 40 to emit the desired amount of light.

The light source information can be obtained by applying current to the light-emitting elements of the light sources 40 to emit light and detecting the amount of light emitted. The obtained light source information is held in the light source information holding unit 130 described below. The obtainment of the light source information can be performed by obtaining and updating the information each time the light sources 40 emit light. It is also possible to obtain the light source information at the beginning of a series of rangefinding processing, hold the light source information in the light source information holding unit 130, and then emit light using the light source information held in the light source information holding unit 130 in subsequent light emission processing. Information indicating damage to the light sources 40 can also be used as the light source information. If the light sources 40 are damaged, high-intensity laser light that is harmful to the human body may be emitted. Accordingly, damage to the light sources 40 can be used as the light source information to stop the use of the damaged light sources 40. Note that failure information in the figure is information indicating damage to the light sources 40, and is data output from the light source driving device 100 to the range sensor 2.

The light source control unit 110 furthermore controls the light-emitting element drive units 150*a* and 150*b*, described later. Control of the light-emitting element drive units 150 and the like can be performed by outputting light emission signals and light emission control signals. A signal obtained by converting the LVDS light emission signal input from the range sensor 2, described above, to a single-ended signal can be used as the light emission signal. The light emission control signal is a signal indicating the light emission current and the like. The light source control unit 110 can output the light emission current corresponding to the light amount in the light emission conditions to the light-emitting element drive units 150 and the like as the light emission control signal. The light emission current when obtaining the light source information is also output as the light emission control signal. The light emission control signal can be constituted by a plurality of bit strings and can be transmitted as serial data. The light emission control signal can also be transmitted as parallel data by a plurality of signal lines. The light source control unit 110 further controls the light source information obtainment unit 120.

The light source information obtainment unit 120 obtains the light source information. This light source information obtainment unit 120 controls the light-emitting element drive units 150*a* and 150*b* and causes the light sources 40 to emit light. The light source information obtainment unit 120 causes the amount of light emitted at this time to be obtained and outputs this amount as the light source information. Note that the obtained light source information is held in the light source information holding unit 130. Additionally, the light source information obtainment unit 120 outputs the light source information held in the light source information holding unit 130 to the light source control unit 110 based on an instruction from the light source control unit 110. The light source control unit 110 calculates the light emission current and the like based on the light source information that has been output, and outputs the light emission current and the like as the light emission control signal to the light-emitting element drive units 150.

The light source information holding unit 130 holds the light source information output from the light source information obtainment unit 120. This light source information holding unit 130 can be constituted by memory or the like. The light source information holding unit 130 overwrites and updates the light source information in its own memory when the light source information is output from the light source information obtainment unit 120. Additionally, the light source information holding unit 130 outputs the held light source information to the light source information obtainment unit 120 based on an instruction from the light source information obtainment unit 120.

The light-emitting element drive units 150*a* and 150*b* drive the light-emitting elements of the light sources 40. These light-emitting element drive units 150 (light-emitting element drive units 150*a* and 150*b*) generate the light emission current based on the light emission signals and light emission control signals output from the light source control unit 110, and supply the current to the light sources 40. The light-emitting element drive units 150 detect light emission amounts based on light reception current output from the light sources 40, and output the amounts to the light source information obtainment unit 120 as the light source information. The light-emitting element drive units 150 also detect damage to the light sources 40 based on the light reception current, and outputs the result as the light source information. The light-emitting element drive unit 150*a* corresponds to the light source 40*a*, and the light-emitting element drive unit 150*b* corresponds to the light source 40*b*. The configurations of the light-emitting element drive units 150 will be described in detail later.

The light emission condition holding unit 140 holds the light emission conditions input from the range sensor 2. This light emission condition holding unit 140 can be constituted by memory or the like. The light emission condition holding unit 140 holds the light emission conditions, and outputs the held light emission conditions to the light source control unit 110, based on the control of the light source control unit 110.

[Configuration of Light Source]

Figure 2:
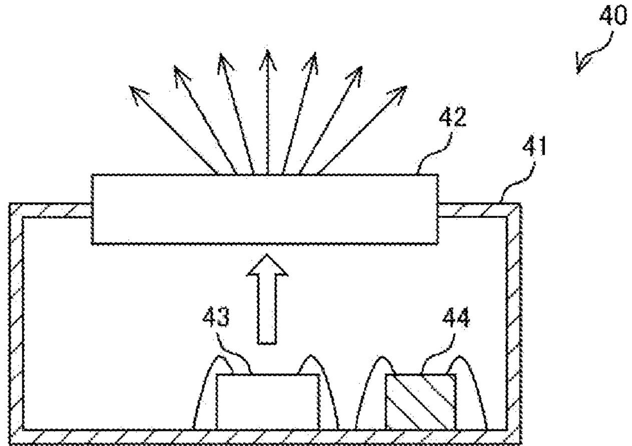
FIG. 2 is a diagram illustrating an example of the configuration of a light source according to an embodiment of the present disclosure.

FIG. 2 is a diagram illustrating an example of the configuration of a light source according to an embodiment of the present disclosure. The figure is a schematic cross-sectional view illustrating an example of the configuration of the light sources 40. The light source 40 in the figure includes an enclosure 41, an emission part 42, a light-emitting element 43, and a light-receiving element 44.

The enclosure 41 houses the light-emitting element 43 and the light-receiving element 44. This enclosure 41 can be constituted by a member that blocks the light from the light-emitting element 43. The emission part 42 is disposed on a top panel of the enclosure 41.

The emission part 42 is a part, disposed on the top panel of the enclosure 41, which protects the light-emitting element 43 and the like and diffuses laser light from the light-emitting element 43. The emission part 42 converts point (one-dimensional) laser light into planar (two-dimensional) emitted light. The white arrows in the figure represent the laser light emitted by the light-emitting element 43, and the solid line arrows represent the laser light transformed to diffuse light by the emission part 42.

The light-emitting element 43 is an element that emits light. For example, a laser diode that emits laser light can be used for the light-emitting element 43. The light-emitting element 43 is supplied with the light emission current from the light-emitting element drive unit 150 via a wire (not shown).

The light-receiving element 44 receives the light from the light-emitting element 43. A light-receiving diode can be used for this light-receiving element 44. The light reception current flows in the light-receiving element 44 in response to the light received. This light reception current is output to the light-emitting element drive unit 150. The light-receiving element 44 in the figure receives the light emitted from the light-emitting element 43 and reflected by the emission part 42. The light-receiving element 44 further receives ambient light. This can be done by detecting the light reception current when the light-emitting element 43 is in a non-emission state.

[Configuration of Light-Emitting Element Drive Unit]

Figure 3:
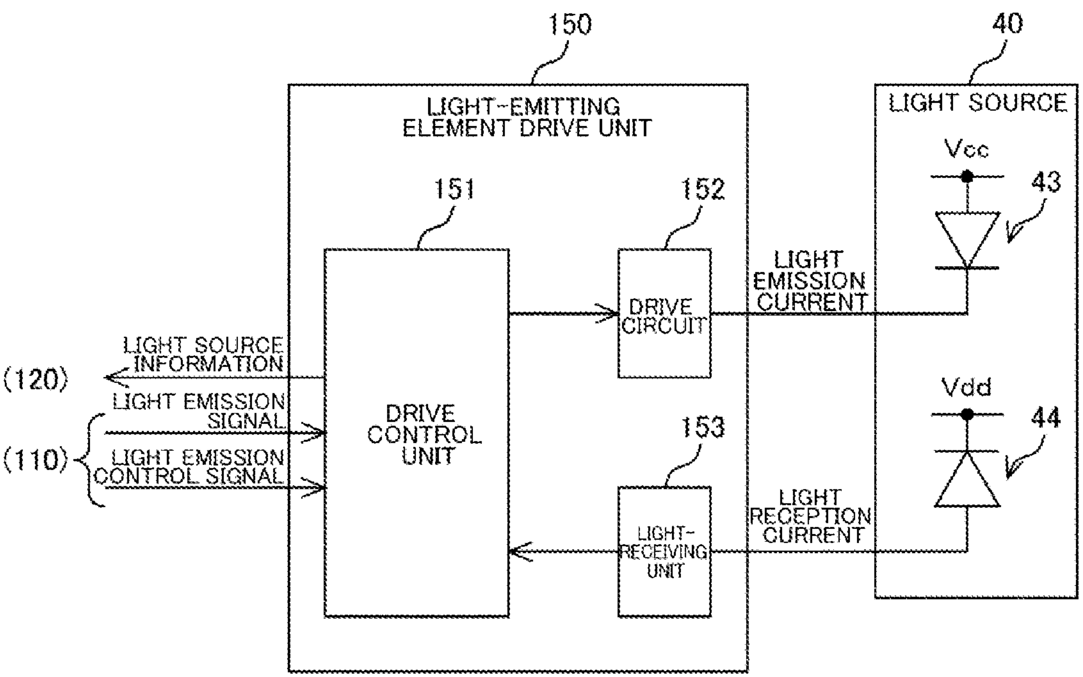
FIG. 3 is a diagram illustrating an example of the configuration of a light-emitting element drive unit according to an embodiment of the present disclosure.

FIG. 3 is a diagram illustrating an example of the configuration of a light-emitting element drive unit according to an embodiment of the present disclosure. The figure illustrates an example of the configuration of the light-emitting element drive units 150. The light-emitting element drive unit 150 in the figure includes a drive control unit 151, a drive circuit 152, and a light-receiving unt 153.

The figure also illustrates the light source 40. Vcc and Vdd in the light source 40 are power supply lines that supply power to the light-emitting element 43 and the light-receiving element 44, respectively. The anode of the light-emitting element 43 is connected to Vcc, and the cathode is connected to the drive circuit 152. The cathode of the light-receiving element 44 is connected to Vdd, and the anode is connected to the light-receiving unit 153.

The drive control unit 151 controls the driving of the light source 40. This drive control unit 151 controls the driving of the light-emitting element 43 of the light source 40 based on the light emission signal and the light emission control signal from the light source control unit 110. The drive control unit 151 performs digital-to-analog conversion of the light emission current based on the light emission control signal, and generates an analog light emission current. The drive control unit 151 generates a series of pulses having an analog light emission current wave height based on the light emission signal, and outputs the series of pulses to the drive circuit 152. The drive control unit 151 can also supply a bias current to the light-emitting element 43. This bias current is a current below the light emission threshold of the light-emitting element 43, and is a current that is supplied to improve the response of the light-emitting element 43.

The drive control unit 151 also detects a received light amount based on the light reception current of the light-receiving element 44. Specifically, the drive control unit 151 converts the received light amount generated based on the light reception current to a digital value by analog-to-digital conversion, and outputs the digital received light amount resulting from the conversion to the light source information obtainment unit 120 as the light source information.

The drive circuit 152 drives the light-emitting element 43 of the light source 40. This drive circuit 152 drives the light-emitting element 43 by supplying the light emission current to the light-emitting element 43. The drive circuit 152 can be constituted by, for example, a current amplifier that amplifies the analog light emission current, the bias current, or the like input by the drive control unit 151. The drive circuit 152 in the figure drives the light-emitting element 43 by supplying sink current thereto.

The light-receiving unit 153 detects the received light amount based on the light reception current of the light-receiving element 44. This light-receiving unit 153 can be constituted by a resistor connected in series with the light-receiving element 44. This resistor converts the light reception current into a voltage signal. The voltage of this signal corresponds to the received light amount. This received light amount is output to the drive control unit 151.

[Obtaining Light Source Information]

Figure 4:
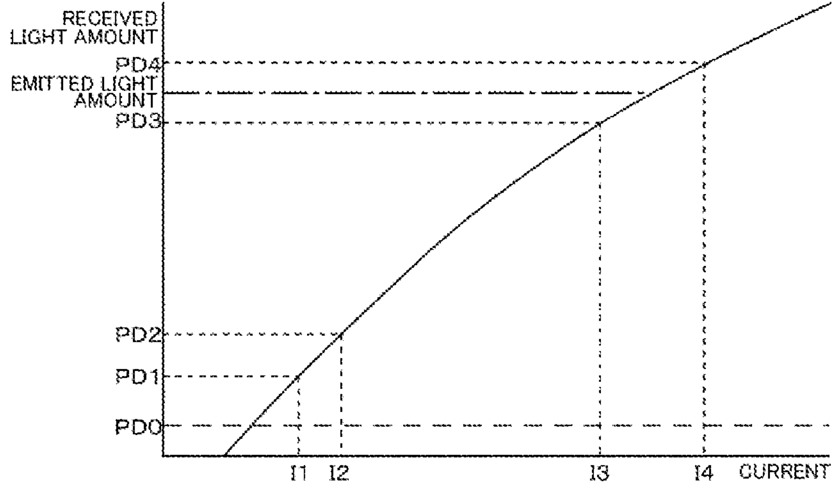
FIG. 4 is a diagram illustrating an example of obtaining light source information according to an embodiment of the present disclosure.

FIG. 4 is a diagram illustrating an example of obtaining light source information according to an embodiment of the present disclosure. The figure illustrates a relationship between the light emission current of the light-emitting element 43 in the light source 40 and the received light amount detected by the light-receiving element 44. The horizontal axis of the graph in the figure represents the current supplied to the light-receiving element 44. The vertical axis in the figure represents the received light amount received by the light-receiving element 44. The procedure for obtaining the light source information will be described next with reference to the figure.

First, the received light amount (PD0, in the figure) is detected with the light-emitting element 43 in a non-emission, i.e., a state in which no current is flowing. This PD0 corresponds to the amount of ambient light. Next, relatively low currents I1 and I2 are supplied to the light-emitting element 43, and received light amounts corresponding to the respective currents are detected as PD1 and PD2. The light emission threshold of the light-emitting element 43 is detected according to PD1 and PD2. Specifically, the light emission threshold is calculated from the values of PD1 and PD2 by linear approximation. This light emission threshold can be calculated by the light source information obtainment unit 120. Next, currents 13 and 14, which are in the vicinity of the light emission current that results in the emitted light amount emitted during rangefinding, are supplied to the light-emitting element 43, and respective currents corresponding to the received light amounts, which are PD3 and PD4, are detected. Information on the linearity of the light-emitting element 43 can be obtained from PD3 and PD4, and the linearity of the light-emitting element 43 in the vicinity of the emitted light amount can be corrected. Specifically, the light emission current corresponding to the emitted light amount can be calculated from the values of PD3 and PD4 by linear approximation.

Damage to the light source 40 can be detected during detection of PD3 and the like. For example, if the received light amount is lower than a specified value when 13 is supplied to the light-emitting element 43, the emission part 42 may have suffered damage, such as being dislodged.

Accordingly, when the received light amount is lower than the specified value, damage to the light source 40 can be detected.

The light source information obtainment unit 120 controls the light-emitting element drive unit 150 to detect PD0, causes the currents corresponding to IL 12, 13, and 14 to be supplied to the light-emitting element 43, and causes PD1, PD2, PD3, and PD4 to be detected. The light-emitting element drive unit 150 outputs the detected PD0 and the like as the light source information to the light source information obtainment unit 120. The light source information obtainment unit 120 obtains the light source information, such as PD0 and the like, from the light-emitting element drive unit 150, generates information on the amount of ambient light, the light emission threshold, and the linearity, and holds that information in the light source information holding unit 130 as new light source information. Information on damage to the light source 40 can also be generated by the light source information holding unit 130. Note that the information such as the light emission threshold, the linearity, and the like can be generated by the light-emitting element drive unit 150.

[Light Emission Conditions]

FIG. 5 is a diagram illustrating an example of light emission conditions according to an embodiment of the present disclosure. The figure illustrates an example of light emission conditions 300 input from the range sensor 2. A in the figure represents an example of the configuration of the light emission conditions 300. B in the figure represents the information that constitutes the light emission conditions 300. The light emission conditions 300 can include information of light source information obtainment 301 and light source selection 302. The light emission conditions 300 can be constituted by 8-bit data, for example.

Light source information obtainment 301 indicates whether the light source information is obtained. This light source information obtainment 301 is 1-bit data. A value of "0" represents the use of the light source information held in the light source information holding unit 130, and a value of "1" represents the obtainment (updating) of the light source information. Power can be saved by using the light source information held in the light source information holding unit 130 instead of obtaining new light source information. On the other hand, the light source information can be updated by obtaining the light source information. Even if the characteristics of the light-emitting element 43 change due to changes in ambient light, ambient temperature, or the like, changes in the characteristics of the light-emitting element 43 can be compensated for.

Light source selection 302 indicates the selection of a plurality of light sources. This light source selection 302 is 2-bit data. The figure illustrates an example of selecting two light sources, namely an A channel and a B channel. The A channel and the B channel correspond to the light source 40*a* and the light source 40*b*, respectively, illustrated in FIG. 1. For values of "0" and "1", the A channel and the B channel are selected simultaneously. In other words, the light source 40*a* and the light source 40*b* emit light simultaneously. For a value of "0", the light source information of the A channel is applied to the B channel, and when the value is "1", the light source information of each channel is applied. For a value of "2", the A channel is selected and the B channel is in a non-emission state. For a value of "3", the B channel is selected and the A channel is in a non-emission state.

Light sources having different characteristics can be provided in the A channel and the B channel. For example, light sources having different emitted light amounts can be provided. In this case, the range sensor 2 can select the A channel and the B channel according to the distance to the object. By selecting the A channel and the B channel simultaneously, the emitted light amount from the light source device 4 can be roughly doubled. The range sensor 2 can select the amount of light by selecting the A channel and the B channel.

[Light Source Driving]

Figure 6:
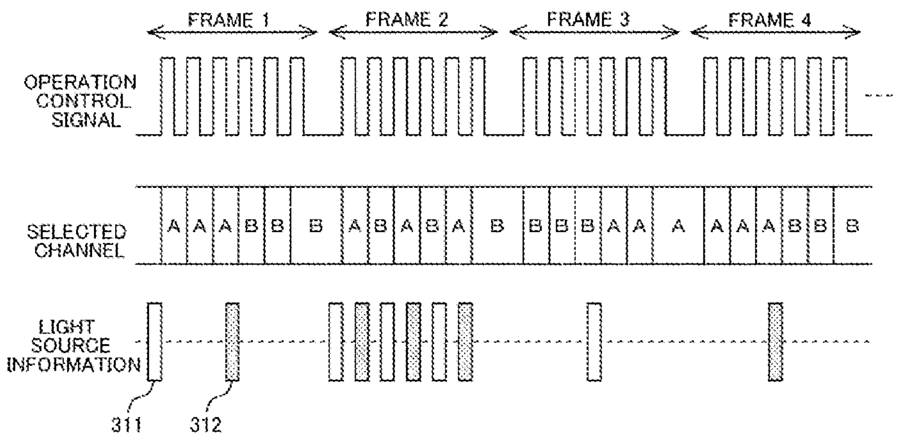
FIG. 6 is a diagram illustrating an example of driving a light source according to an embodiment of the present disclosure.

FIG. 6 is a diagram illustrating an example of driving a light source according to an embodiment of the present disclosure. The figure illustrates a timing chart representing the driving of the light sources 40. "Operation control signal" in the figure represents the operation control signal input from the range sensor 2. "Selected channel" represents the channel selected by the light emission conditions 300. "Light source information" represents the obtainment of the light source information, and the light source information is obtained in the rectangular part. Note that the white rectangles 311 represent the light source information for the A channel, and the hatched rectangles 312 represent the light source information for the B channel.

Rangefinding processing by the range sensor 2 is constituted by a plurality of frames. Each frame is constituted by a plurality of microframes. One cycle of the operation control signal corresponds to a microframe. Channels can be selected every microframe. Frame 1 in the figure represents an example where the A channel is selected in the first half and the B channel in the second half. The light source information for the A channel is obtained immediately before the first microframe. The light source information for the B channel is obtained immediately before switching to the B channel in the second half. Frame 2 represents an example of alternating between the A channel and the B channel. The light source information is obtained every microframe. Frames 3 and 4 represent examples in which the obtainment of the light source information in the first microframe of the frame is skipped. If the same channel as in the last microframe of the immediately-preceding frame is selected, the obtainment of the light source information in the first microframe of the frame can be skipped.

Figure 7:
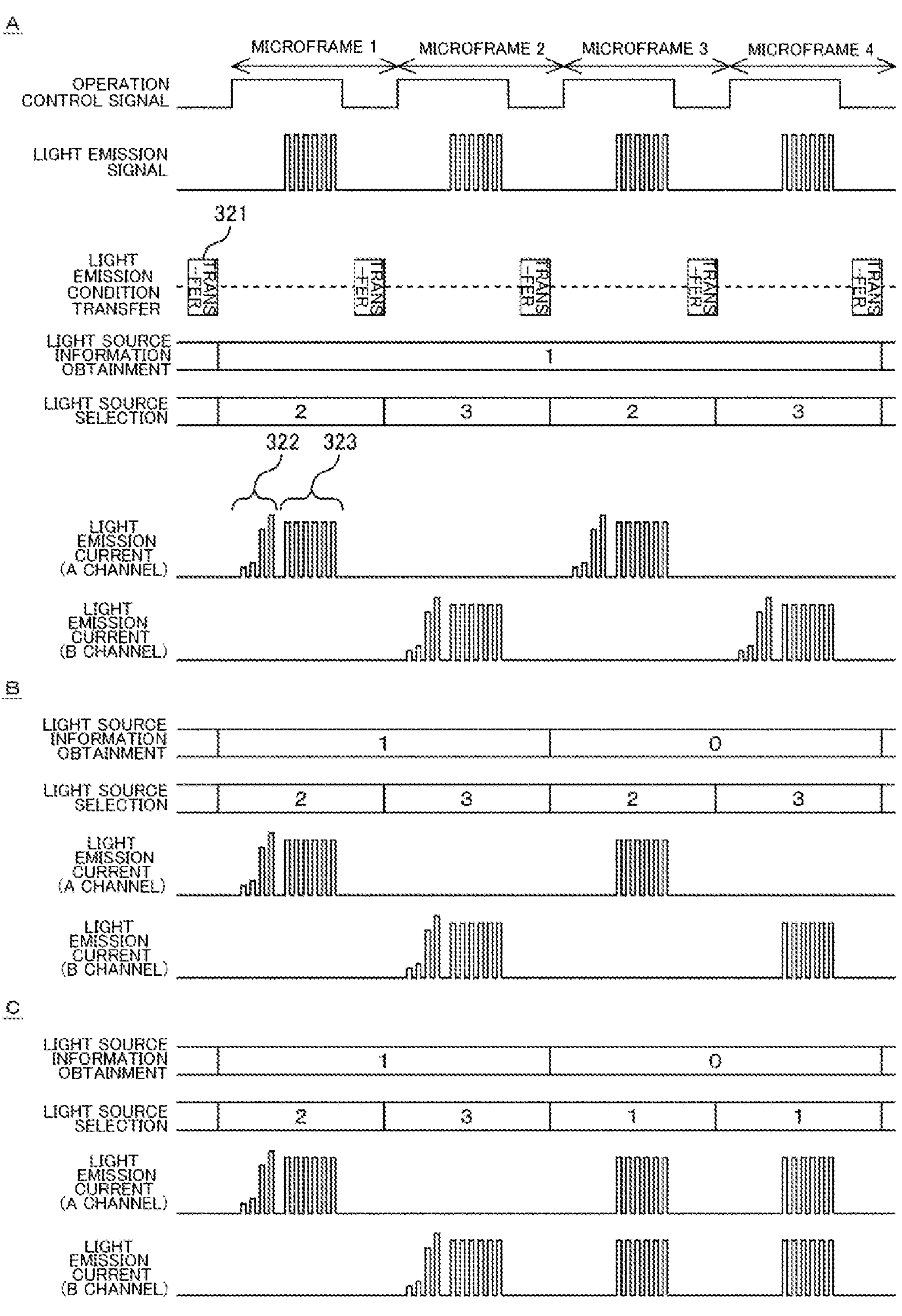
FIG. 7 is a diagram illustrating an example of driving a light source according to an embodiment of the present disclosure.

FIG. 7 is a diagram illustrating an example of driving a light source according to an embodiment of the present disclosure. This figure is an enlarged version of the timing chart in FIG. 6. "Light emission signal" in the figure represents the light emission signal input from the range sensor 2. "Light emission condition transfer" represents the transfer of the light emission conditions from the range sensor 2. Rectangles 321 represent the timing at which the light emission conditions are transferred. "Light source information obtainment" and "light source selection" represent the values of light source information obtainment 301 and light source selection 302 illustrated in FIG. 5. "Light emission current (A channel)" and "light emission current (B channel)" represent the light emission currents of the light sources 40 in the A channel and the B channel, respectively. A to C in the figure represent the operations when "light source information obtainment" and "light source selection" are changed, respectively. Light emission current 322 represents the current flowing in the light source 40 when the light source information is obtained. Light emission current 323 represents the light emission current flowing in the light source 40 during rangefinding.

In A in the figure, when the operation control signal has a value of "1", light is emitted from the light source 40, and when the value is "0", the light emission conditions are transferred. The light emission signal is output in a latter stage of the period when the operation control signal has a value of "1". As illustrated in the figure, the light emission signal is a waveform constituted by a plurality of series of pulses. Light source information obtainment 301 has a value of "1" in microframes 1 through 4. Accordingly, the light source information is obtained every microframe. Light source selection 302 has a value of "2" in microframes 1 and 3, and the A channel is selected. Meanwhile, light source selection 302 has a value of "3" in microframes 2 and 4, and the B channel is selected. In microframes 1 and 3, the light source information for the A channel is obtained, and light is emitted. In microframes 2 and 4, the light source information for the B channel is obtained, and light is emitted.

In B in the figure, light source information obtainment 301 has a value of "1" in microframes 1 and 2, and has a value of "0" in microframes 3 and 4. Therefore, the light source information is obtained in microframes 1 and 2, but the light source information is not obtained in microframes 3 and 4. Light source selection 302 takes the same value as A in the figure. In microframe 1, the light source information for the A channel is obtained, and light is emitted. In microframe 2, the light source information for the B channel is obtained, and light is emitted. In microframe 3, light is emitted from the A channel. In microframe 4, light is emitted from the B channel. In microframes 3 and 4, the light source information held in the light source information holding unit 130 is used.

In C in the figure, light source information obtainment 301 has a value of "1" in microframes 1 and 2, and has a value of "0" in microframes 3 and 4, similar to B in the figure. For light source selection 302, microframes 1 and 2 have the same value as in B in the figure. In microframes 3 and 4, light source selection 302 has a value of "1". Accordingly, the A channel and the B channel are selected simultaneously in microframes 3 and 4. Unlike B in the figure, light is emitted simultaneously from the A channel and the B channel in microframes 3 and 4. The amount of light can be roughly doubled.

[Light Source Control Processing]

Figure 8:
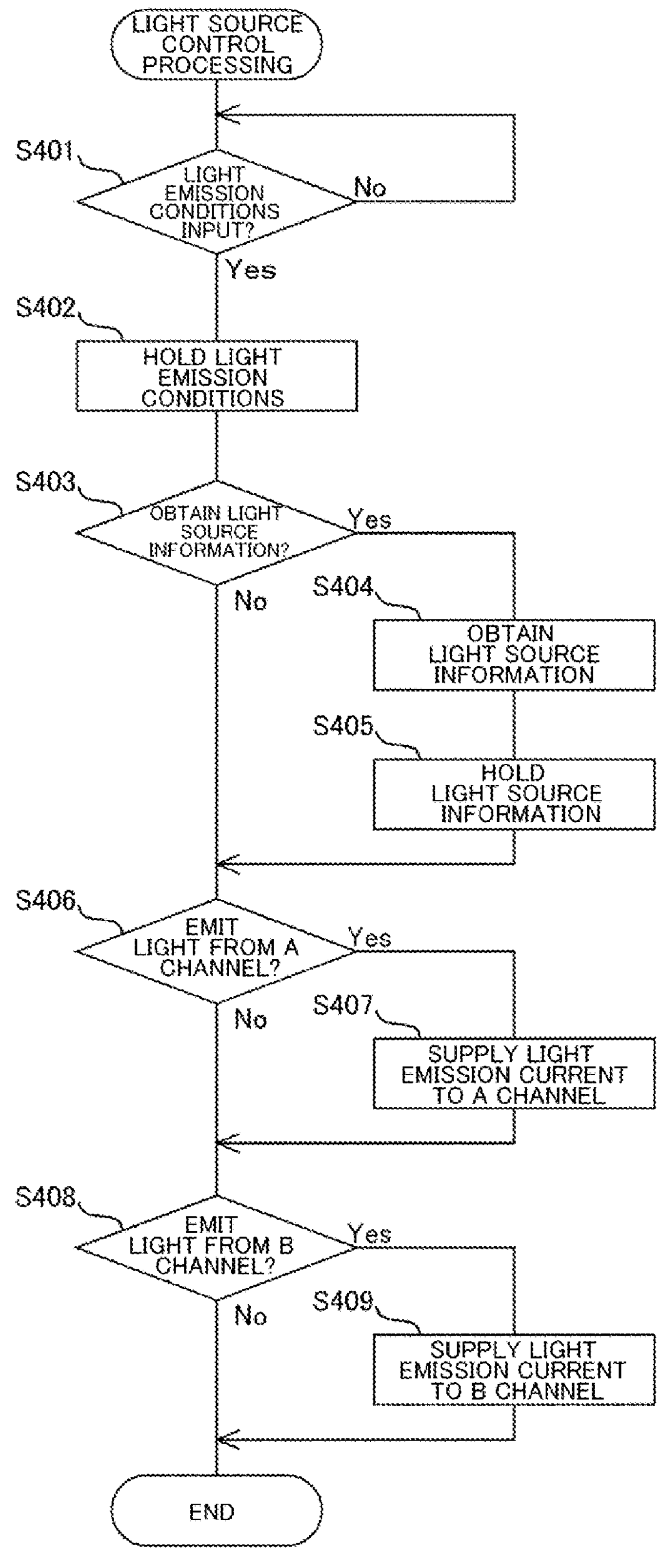
FIG. 8 is a diagram illustrating an example of light source control processing according to an embodiment of the present disclosure.

FIG. 8 is a diagram illustrating an example of light source control processing according to an embodiment of the present disclosure. The figure illustrates an example of processing by the light source driving device 100 illustrated in FIG. 1. First, the device stands by until light emission conditions are input (S401). When the light emission conditions are input to the light source control unit 110 from the range sensor 2 (S401: Yes), the sequence moves to S402.

In S402, the light source control unit 110 holds the input light emission conditions in the light emission condition holding unit 140 (S402).

Next, whether to obtain the light source information is determined based on the light emission conditions held in the light emission condition holding unit 140 (S403). If the obtainment of the light source information is specified in the light emission conditions (S403: Yes), the light source control unit 110 obtains the light source information (S404). Specifically, the light source control unit 110 controls the light source information obtainment unit 120 to obtain the light source information. Next, the light source information obtainment unit 120 holds the obtained light source information in the light source information holding unit 130 (S405). The light source control unit 110 then moves to the process of S406.

On the other hand, if the obtainment of the light source information is not specified in S403 (S403: No), the light source control unit 110 moves to the process of S406.

In S406, light emission in the A channel is determined (S406). This determination is made by the light source control unit 110 based on the light emission conditions held in the light emission condition holding unit 140. If the A channel is selected in the light emission conditions (S406: Yes), the light source control unit 110 supplies the light emission current to the A channel (S407). Specifically, the light source control unit 110 outputs the light emission signal and the light emission control signal to the light-emitting element drive unit 150*a* corresponding to the A channel, and drives the light source 40*a*. The light source control unit 110 then moves to the process of S408. On the other hand, if the A channel is not selected in the light emission conditions (S406: No), the light source control unit 110 moves to the process of S408.

In S408, light emission in the B channel is determined (S408). This determination is made by the light source control unit 110 based on the light emission conditions held in the light emission condition holding unit 140. If the B channel is selected in the light emission conditions (S408: Yes), the light source control unit 110 supplies the light emission current to the B channel (S409). The light source control unit 110 outputs the light emission signal and the light emission control signal to the light-emitting element drive unit 150*b* corresponding to the B channel, and drives the light source 40*b*. The light source control unit 110 then ends the light source control processing. On the other hand, if the B channel is not selected in the light emission conditions (S408: No), the light source control unit 110 ends the light source control processing.

In this manner, the light source driving device 100 selects and drives one or both of the light sources 40*a* and 40*b* based on the light emission conditions from the range sensor 2. The range sensor 2 can drive the plurality of light sources 40 simultaneously by outputting the light emission signal and the like to the light source driving device 100.

Note that the configuration of the light source device 4 is not limited to this example. For example, the device can be configured including three or more light sources 40. In this case, the light source driving device 100 includes the same number of light-emitting element drive units 150 as there are light sources 40, and the light source control unit 110 controls the respective light-emitting element drive units 150.

As described thus far, the light source driving device 100 of the embodiment of the present disclosure controls the emission of light from the plurality of light sources 40 using the light source control unit 110. This makes it possible to simplify the configuration of the light source driving device 100.

<2. Variations>

Figure 9:
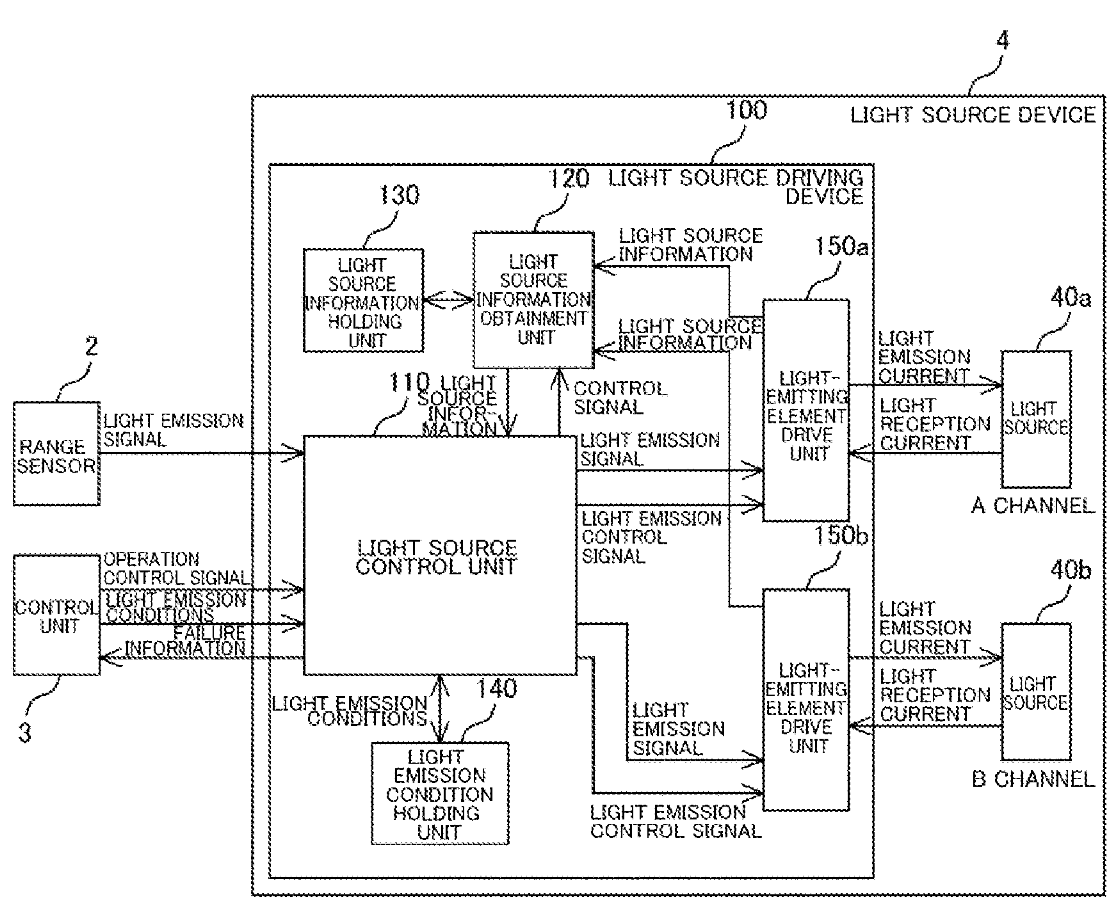
FIG. 9 is a diagram illustrating an example of the configuration of a light source device according to a variation on an embodiment of the present disclosure.

[Configuration of Image Sensor] FIG. 9 is a diagram illustrating an example of the configuration of a light source device according to a variation on an embodiment of the present disclosure. The figure is a diagram illustrating an example of the configuration of the light source device 4, similar to FIG. 1. The light source device differs from the light source device 4 illustrated in FIG. 1 in that instead of the range sensor 2, a control unit 3 outputs the operation control signal and the light emission conditions to the light source control unit 110.

The control unit 3 is constituted by an application processor or the like, and controls the light source device 4. The light source control unit 110 outputs failure information to the control unit 3.

[Configuration of Light Source]

Figure 10:
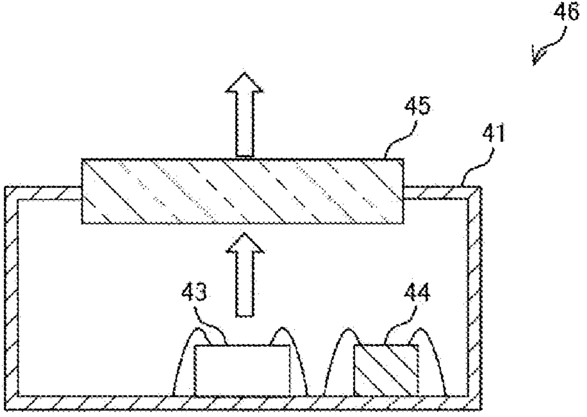
FIG. 10 is a diagram illustrating an example of the configuration of a light source according to a variation on an embodiment of the present disclosure.

FIG. 10 is a diagram illustrating an example of the configuration of a light source according to a variation on an embodiment of the present disclosure. The figure illustrates an example of the configuration of a light source 46. The light source 46 differs from the light source 40 of FIG. 2 in that an emission part 45 is provided instead of the emission part 42.

The emission part 45 is an emission part constituted by a transparent member such as glass. Because the light from the light-emitting element 43 is not diffused by the emission part 45, the light source 46 is a point light source. Although the resolution is lower than that of the light source 40 constituting the surface light source in FIG. 2, multipath errors can be reduced. Here, multipath error is error caused by light reflected along a plurality of paths, such as the corners of a room, entering the range sensor 2. When employing the light source illustrated in the figure, light emission conditions including an emission range can be used. For example, a configuration can be employed in which the light source 40 and the light source 46 are provided in the light source device 4, and these light sources are selected according to the information on the emission range in the light emission conditions.

Aside from this, the configuration of the light source device 4 is the same as the configuration of the light source device 4 illustrated in FIG. 1, and will therefore not be described.

3. Example of Application in Rangefinding Device

The technique according to the present disclosure can be applied in various products. For example, the technique according to the present disclosure may be applied in a rangefinding device. A rangefinding device is a device that measures the distance to an object.

[Configuration of Image Capturing Device]

Figure 11:
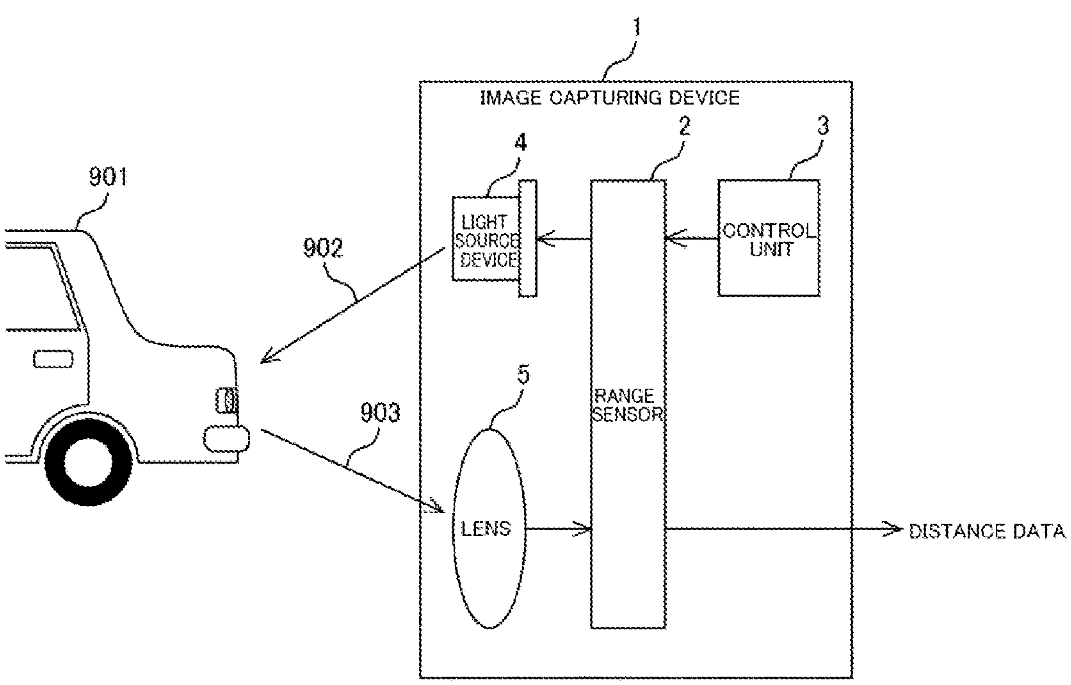
FIG. 11 is a diagram illustrating an example of the configuration of an image capturing device provided for a rangefinding device to which the technique of the present disclosure can be applied.

FIG. 11 is a diagram illustrating an example of the configuration of an image capturing device provided for a rangefinding device to which the technique of the present disclosure can be applied. The figure is a block diagram illustrating an example of the configuration of an image capturing device 1 constituting the rangefinding device. The image capturing device 1 in the figure includes the range sensor 2, the control unit 3, the light source device 4, and a lens 5. Note that the figure also illustrates an object 901 to which the distance is to be measured.

The lens 5 is a lens that forms an image of the object on the range sensor 2.

The light source device 4 emits light to the object to which the distance is to be measured. This light source device 4 can use, for example, a laser light source that emits infrared light.

The control unit 3 controls the image capturing device 1 as a whole.

The range sensor 2 is a sensor that measures the distance to an object. This range sensor 2 emits emitted light 902 to the object 901 by controlling the light source device 4. The emitted light 902 is reflected from the object 01 and becomes reflected light 903. Upon detecting the reflected light 903, the range sensor 2 measures the time from the emission of the emitted light 902 to the detection of the reflected light 903, and measures the distance to the object 901. This measured distance is output to the outside of the image capturing device 1 as distance data.

[Configuration of Range Sensor]

Figure 12:
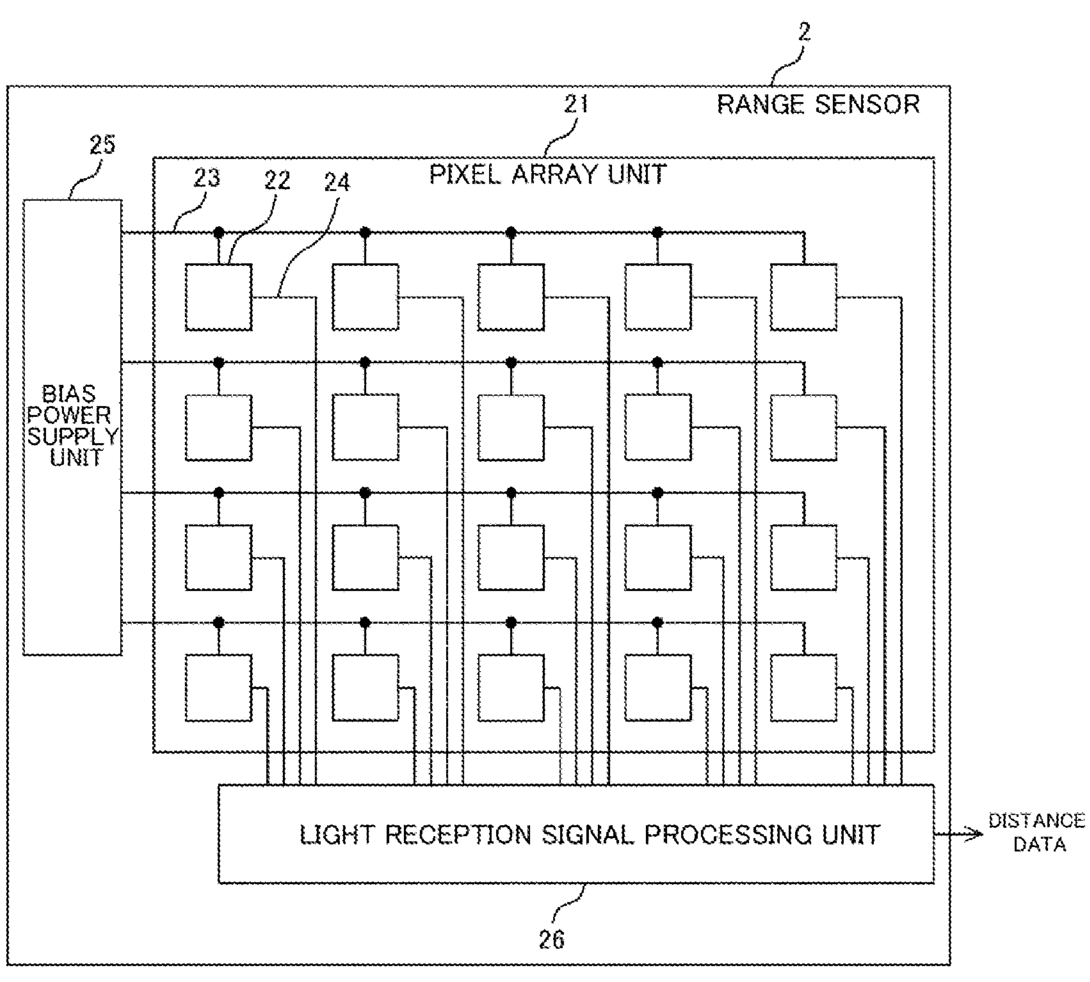
FIG. 12 is a diagram illustrating an example of the configuration of a range sensor provided for a rangefinding device to which the technique of the present disclosure can be applied.

FIG. 12 is a diagram illustrating an example of the configuration of a range sensor provided for a rangefinding device to which the technique of the present disclosure can be applied. The range sensor 2 in the figure includes a pixel array unit 10, a bias power supply unit 25, and a light reception signal processing unit 26.

The pixel array unit 10 is constituted by a plurality of pixels 22, each having a photoelectric conversion unit that performs photoelectric conversion of incident light, arranged in a two-dimensional grid. Each of the pixels 22 detects incident light and outputs a light reception signal as a detection result. A photodiode, an APD, a SPAD, or the like can be used for the photoelectric conversion units, for example. The following will assume that a SPAD is disposed in each of the pixels 22 as the photoelectric conversion unit. Signal lines 23 and 24 are connected to each pixel 22. The signal line 23 is a signal line that supplies a bias voltage for the pixel 22. The signal line 24 is a signal line that transmits the light reception signal from the pixel 22. Although an example in which four rows by five columns of the pixels 22 are provided in the pixel array unit 10 is illustrated in the figure, the number of the pixels 22 provided in the pixel array unit 10 is not limited.

The bias power supply unit 25 is a power supply that supplies a bias voltage to the pixels 22. The bias power supply unit 25 supplies the bias voltage over the signal line 23.

The light reception signal processing unit 26 processes the light reception signals output from the plurality of pixels 22 disposed in the pixel array unit 10. The processing by the light reception signal processing unit 26 corresponds to, for example, processing of detecting the distance to an object based on incident light detected by the pixels 22. Specifically, the light reception signal processing unit 26 can perform ToF (Time of Flight)-based distance detection processing used when measuring the distance to a distant object in an image capturing device such as an in-vehicle camera. In this distance detection processing, a light source disposed in the image capturing device irradiates the object with light, detects the reflected light reflected by the object, and measures the time from when the light is emitted from the light source to when the reflected light is detected to detect the distance.

Note that the pixel 22 is an example of a sensor described in the claims. The light reception signal processing unit 26 is an example of a processing circuit described in the claims.

[Rangefinding Processing]

Figure 13:
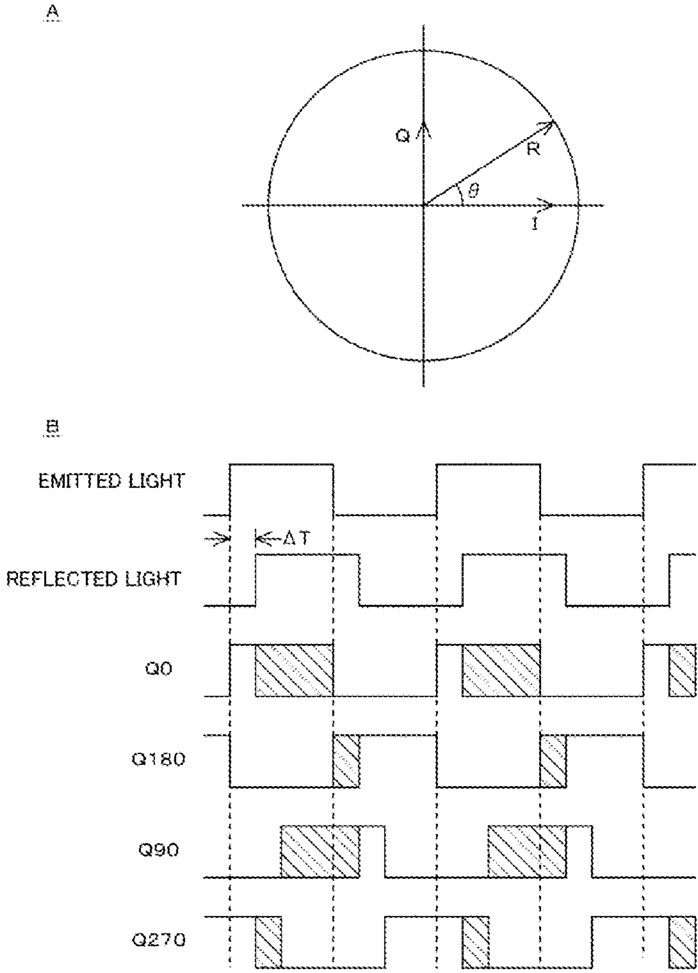
FIG. 13 is a diagram illustrating an example of rangefinding related to a rangefinding device to which the technique of the present disclosure can be applied.

FIG. 13 is a diagram illustrating an example of rangefinding related to a rangefinding device to which the technique of the present disclosure can be applied. A in the figure illustrates a relationship between the emitted light emitted from the light source device 4 and the reflected light reflected by the object. In A in the figure, the direction of the positive x-axis corresponds to the phase of the emitted light. The "R" in A in the figure represents the reflected light. A phase difference θ arises between the emitted light and the reflected light R, according to the distance. By detecting this phase difference θ, the distance to the object can be measured. Here, light I represents reflected light in phase with the emitted light, and light Q represents reflected light at a phase advanced by 90 degrees relative to the emitted light. The phase difference θ can be expressed by the following formula.

$$\theta = \arctan(Q/I)$$

Here, I represents the wave height of the reflected light in phase with the emitted light. Q represents the wave height of the reflected light at a phase advanced by 90 degrees. In this figure, A assumes sinusoidal emitted light and the like, but 0 can also be calculated for pulsed emitted light and the like using the above formula. This can be done by detecting the reflected light at a plurality of timings that differ in phase by 90 degrees with respect to the emitted light. B in the figure represents this situation.

The "emitted light" and "reflected light" in B in the figure represent the waveforms of the emitted light and the reflected light, respectively. The reflected light has a waveform delayed by ΔT relative to the emitted light. This ΔT is the time required for the light to travel to and return from the object. A distance D to the object can be expressed by the following formula.

$$D = c \times \Delta T/2 = c \times \theta/(4\Pi \times f)$$

Here, c is the speed of light. f represents the frequency of the emitted light.

Additionally, "Q0", "Q180", "Q90", and "Q270" in B in the figure represent cases where the reflected light is detected at a phase shifted from that of the emitted light by 0, 180, 90, and 270 degrees, respectively. Reflected light is detected during the period when the value of the waveform of "Q0" and the like is "1". The diagonally-hatched areas in the waveforms of "Q0" and the like represent the reflected light to be detected. With this "Q0" and the like, I and Q can be expressed as follows.

$$I = Q0 - Q180$$

$$Q = Q90 - Q270$$

This makes it possible to express θ through the following formula.

$$\theta = \arctan\left((Q90 - Q270)/(Q0 - Q180)\right)$$

By substituting this θ into the above formula, the distance D to the object can be calculated.

Finally, the descriptions of the above-described embodiments are merely examples of the present disclosure, and the present disclosure is not limited to the above-described embodiments. Therefore, it goes without saying that various changes aside from the above-described embodiments can be made according to the design and the like within a scope that does not depart from the technical spirit of the present disclosure.

Additionally, the effects described in the present specification are merely exemplary and not limited. Other effects may be obtained as well.

The drawings in the above-described embodiments are schematic, and the dimensional ratios and the like of each part do not necessarily match the actual ones. In addition, the drawings of course include parts where dimensional relationships and ratios differ from drawing to drawing.

In addition, the processing procedures in the above-described embodiments may be understood as methods including the series of procedures or may be understood as a program that causes a computer to perform the series of procedures and a recording medium that stores the program.

As the recording medium, for example, a compact disc (CD), a digital versatile disc (DVD), a memory card, or the like can be used.

Note that the present technique can also have the following configurations.

(1) A light source driving device including: a light source control unit that individually controls emission of light from a plurality of light sources that emit the light to an object to measure a distance to the object.

(2) The light source driving device according to (1), wherein each of the light sources includes a laser diode.

(3) The light source driving device according to (1) or (2), wherein the light source control unit controls the emission of the light based on a light emission condition that is a condition for emitting the light in the plurality of light sources.

(4) The light source driving device according to (3), wherein the light source control unit controls the emission of the light based on the light emission condition, the light emission condition including a light amount in the plurality of light sources.

(5) The light source driving device according to (3), wherein the light source control unit controls the emission of the light based on the light emission condition, the light emission condition including an emission range of the light in the plurality of light sources.

(6) The light source driving device according to (3), further including: a light source information obtainment unit that obtains light source information that is information about the plurality of light sources, wherein the light source control unit controls the emission of the light based on the light source information and the light emission condition.

(7) The light source driving device according to (6), wherein the light source information obtainment unit obtains ambient light in the plurality of light sources as the light source information.

(8) The light source driving device according to (6), wherein the light source information obtainment unit obtains information about light emission current, the light emission current being current that causes the plurality of light sources to emit light, as the light source information.

(9) The light source driving device according to (8), wherein the light source information obtainment unit obtains information about a threshold of the light emission current in the plurality of light sources as the light source information.

(10) The light source driving device according to (8), wherein the light source information obtainment unit obtains information about a linearity of the light emission current in the plurality of light sources as the light source information.

(11) The light source driving device according to (6), wherein the light source information obtainment unit obtains damage to the plurality of light sources as the light source information.

(12) The light source driving device according to (6), further including: a light source information holding unit that holds the light source information obtained.

(13) The light source driving device according to (6), wherein the light source information obtainment unit obtains the light source information based on a detection result from a light-receiving unit that detects light.

(14) The light source driving device according to (6), wherein the light source control unit controls the emission of the light based on the light emission condition, the light emission condition including information as to whether or not to obtain the light source information.

(15) The light source driving device according to any one of (1) to (15), wherein the light source control unit controls the plurality of light sources to emit the light simultaneously.

(16) A light source device including: a plurality of light sources that emit for measuring a distance to an object by causing the light to travel back and forth to and from the object and measuring a time required for the light to travel back and forth; and a light source control unit that controls emission of the light in the plurality of light sources.

(17) An image capturing device including: a plurality of light sources that emit light to an object; a light source control unit that individually controls emission of the light in the plurality of light sources; a sensor that detects reflected light that has been emitted and reflected by the object; and a processing circuit that performs processing of detecting a distance to the object by measuring a time from when the light is emitted to when the reflected light is detected.

REFERENCE SIGNS LIST

1 Image capturing device
2 Range sensor
3 Control unit
4 Light source device
22 Pixel
26 Light reception signal processing unit
40, 40*a*, 40*b*, 46 Light source
43 Light-emitting element
44 Light-receiving element
100 Light source driving device
110 Light source control unit
120 Light source information obtainment unit
130 Light source information holding unit
140 Light emission condition holding unit
150, 150*a*, 150*b* Light-emitting element drive unit
151 Drive control unit
152 Drive circuit
153 Light-receiving unit
300 Light emission conditions
301 Light source information obtainment
302 Light source selection

What is claimed is:

1. A light source driving device, comprising:

a light source information obtainment unit that obtains light source information about an amount of light emitted by, and an amount of ambient light in, a plurality of light sources; and a light source control unit that transmits a light emission control signal constituting a plurality of bit strings to the plurality of light sources to individually control emission of the light from the plurality of light sources to an object to measure a distance to the object, wherein the light source control unit controls the emission of the light based on the light source information and light emission conditions for emitting the light from the plurality of light sources, and the light emission conditions are provided by a bit string stored in memory accessible by the light source control unit, the bit string representing the light emission conditions.

2. The light source driving device according to claim 1, wherein each light source of the plurality of light sources includes a laser diode.

3. The light source driving device according to claim 1, further comprising a light-emitting element drive unit for the plurality of light sources, wherein the light source information obtainment unit controls the light-emitting element drive unit and causes the plurality of light sources to emit light.

4. The light source driving device according to claim 3, wherein the light source control unit calculates a light emission current based on the light source information and outputs a light emission current as the light emission control signal to the light-emitting element drive unit.

5. The light source driving device according to claim 3, wherein the light emission conditions include an emission range of the light in the plurality of light sources.

6. The light source driving device according to claim 1, wherein the light source information obtainment unit obtains information about a light emission current as the light source information, the light emission current being current that causes the plurality of light sources to emit light.

7. The light source driving device according to claim 6, wherein the light source information obtainment unit obtains information about a threshold of the light emission current in the plurality of light sources as the light source information.

8. The light source driving device according to claim 6, wherein the light source information obtainment unit obtains, as the light source information, information about a linearity of the light emission current that causes light emitting elements of the plurality of light sources to emit light.

9. The light source driving device according to claim 1, wherein the light source information obtainment unit obtains damage to the plurality of light sources as the light source information.

10. The light source driving device according to claim 1, further comprising a light emission condition holding unit, wherein the light source control unit causes the light source information obtainment unit to obtain the light source information based on the light emission conditions held in the light emission conditions holding unit; and in response to the light emission conditions being held in the light emission condition holding unit specifying obtainment of the light source information:

the light source control unit causes the light source obtainment unit to obtain the light source information; and the light source information obtainment unit holds the obtained light source information in a light source information holding unit.

11. The light source driving device according to claim 1, wherein the light source information obtainment unit obtains the light source information based on a detection result from a light-receiving unit that detects light.

12. The light source driving device according to claim 1, wherein light emission conditions include information as to whether or not to obtain the light source information.

13. The light source driving device according to claim 1, wherein the light source control unit controls the plurality of light sources to emit the light simultaneously.

14. The light source driving device according to claim 1, further comprising the plurality of light sources.

15. A light source device comprising:

a plurality of light sources that emit light to an object to measure a distance to the object;

a light source information obtainment unit that obtains light source information about an amount of light emitted by, and an amount of ambient light in, a plurality of light sources; and a light source control unit that transmits a light emission control signal constituting a plurality of bit strings to the plurality of light sources to individually control emission of the light from the plurality of light sources, wherein the light source control unit controls the emission of the light based on the light source information and light emission conditions for emitting the light from the plurality of light sources, and the light emission conditions are provided by a bit string stored in memory accessible by the light source control unit, the bit string representing the light emission conditions.

16. The light source device according to claim 15, further comprising a light emission condition holding unit, wherein the light source control unit causes the light source information obtainment unit to obtain the light source information based on the light emission conditions held in the light emission conditions holding unit; and in response to the light emission conditions being held in the light emission condition holding unit specifying obtainment of the light source information:

the light source control unit causes the light source obtainment unit to obtain the light source information; and the light source information obtainment unit holds the obtained light source information in a light source information holding unit.

17. An image capturing device comprising:

a plurality of light sources that emit light to an object;

a light source information obtainment unit that obtains light source information about an amount of light emitted by. and an amount of ambient light in. a plurality of light sources:

a light source control unit that transmits a light emission control signal constituting a plurality of bit strings to the plurality of light sources to individually control emission of the light from the plurality of light sources, wherein the light source control unit controls the emission of the light based on the light source information and light emission conditions for emitting the light from the plurality of light sources, and the light emission conditions are provided by a bit string stored in memory accessible by the light source control unit, the bit string representing the light emission conditions;

a sensor that detects reflected light that has been emitted and reflected by the object; and a processing circuit that performs processing of detecting a distance to the object by measuring a time from when the light is emitted to when the reflected light is detected.

18. The image capturing device according to claim 17, further comprising a light emission condition holding unit, wherein the light source control unit causes the light source information obtainment unit to obtain the light source information based on the light emission conditions held in the light emission conditions holding unit; and in response to the light emission conditions being held in the light emission condition holding unit specifying obtainment of the light source information:

the light source control unit causes the light source obtainment unit to obtain the light source information; and the light source information obtainment unit holds the obtained light source information in a light source information holding unit.

* * * * *